Feb. 2, 1960  R. H. HOPKINS  2,923,368
METHOD AND APPARATUS FOR SEISMIC PROSPECTING
Filed June 13, 1955  3 Sheets-Sheet 1

FIG. I.

*INVENTOR.*
RICHARD H. HOPKINS
*BY*
ATTORNEYS

INVENTOR.
RICHARD H. HOPKINS

United States Patent Office 2,923,368
Patented Feb. 2, 1960

2,923,368

METHOD AND APPARATUS FOR SEISMIC PROSPECTING

Richard H. Hopkins, Beaumont, Tex., assignor to Sun Oil Company, Philadelphia, Pa., a corporation of New Jersey Application June 13, 1955, Serial No. 514,941

12 Claims. (Cl. 181—.5)

This invention relates to seismic prospecting and, more particularly, relates to the determination of locations of subsurface boundaries on scaled drawings.

One of the problems involved in seismic prospecting work is the determination of boundaries between various formations. As examples, there are the problems of determining the boundaries of salt domes, weathered layers, etc. Seismic detector records give travel times of disturbances originating at shots to various detectors, and from these travel times boundaries may be calculated but the calculations are matters of considerable complexity and are time-consuming. For each particular wave path between a shot point and a detector there may be plotted a locus which satisfies the time-distance-velocity equation involved, the locus having the significance that some point thereof represents the point of the boundary through which the wave path passed. If a number of sufficiently closely adjacent loci are plotted, the boundary sought may be considered to be the envelope of the loci. The procedure of determining the loci, however, is time-consuming.

This process is further complicated in those areas where seismic wave velocity through the earth changes with depth. In these areas the ray paths of seismic waves, other than the path extending in the direction of maximum velocity change, are no longer straight lines. If the wave velocity changes uniformly with depth, the ray paths will be curved and the direction of travel of each ray path at each point along the ray path will be at right angles to the wave front at that point. In this case, the only ray path that is a straight line will be one in the direction of maximum velocity change.

When the change in the wave velocity causes only slight curving of the ray paths, the ray paths may be assumed to be straight lines in many instances without causing any sensible error in the interpretation of seismic data. This is particularly true if only horizontal reflecting interfaces are being mapped. When, however, the dip in the reflecting interfaces becomes appreciable, approaching 10° or more, the error introduced in the interpretation of the seismic data due to neglecting the curving of the ray paths caused by variations in seismic wave velocities may become considerable. It is then necessary to take into account the curving of the ray paths in order to find the correct dip, horizontal displacement and depth of a reflecting interface. In other words, if an appreciable variation of velocity with depth does occur, it frequently becomes necessary to take into account the curving of the ray path in order to obtain more dependable interpretation of the seismic data with regard to the geologic structures being mapped.

If seismic velocity can be approximated with sufficient accuracy as changing linearly with depth, then the velocity $V$ at any point in the earth may be expressed as the sum of an initial velocity $V_0$ and the product of the depth $Z$ by a constant $K$ or, velocity $V = V_0 + KZ$.

With this velocity function it can be shown that, in two dimensions, the wave fronts are non-concentric circles with centers on a line in the direction of maximum velocity change. When the velocity increases linearly with depth, these centers will be on a line extending downwardly below the source of seismic disturbance. The ray paths are represented by a family of circles orthogonal to the wave front circles. This phenomenon is well known in the art.

It is the primary object of this invention to provide for the plotting of inclined subsurface boundaries on a scaled drawing.

It is a further object of the invention to provide apparatus employing a rod fixed at one end and bent by a force applied to the rod perpendicular to the tangent at the free end of the rod to approximate a curved ray path.

These and other objects of the invention will become apparent from the following description when read in conjunction with the accompanying drawings in which.

Figures 3, 5, 6:
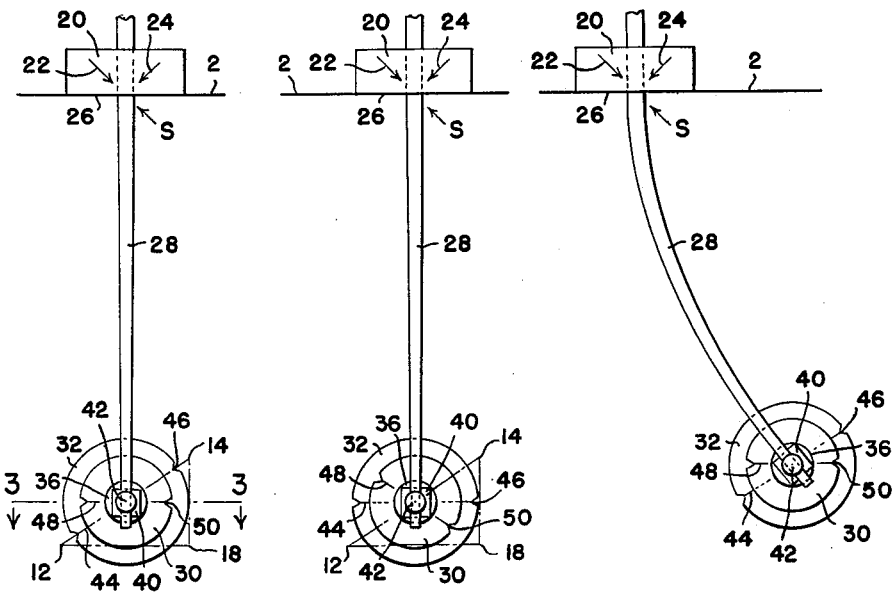
Figure 3 is a plan view of apparatus embodying the invention.
Figure 5 is a plan view of the apparatus showing parts thereof displaced from their positions as shown in Figure 3 representing a second step in the manipulation of the apparatus.
Figure 4:
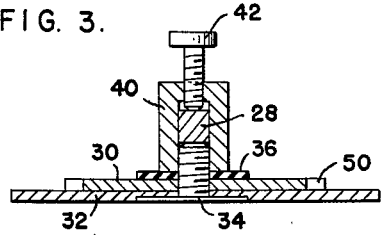
Figure 4 is a section through a portion of the apparatus taken on the trace 3—3 shown in Figure 3.
Figure 7:
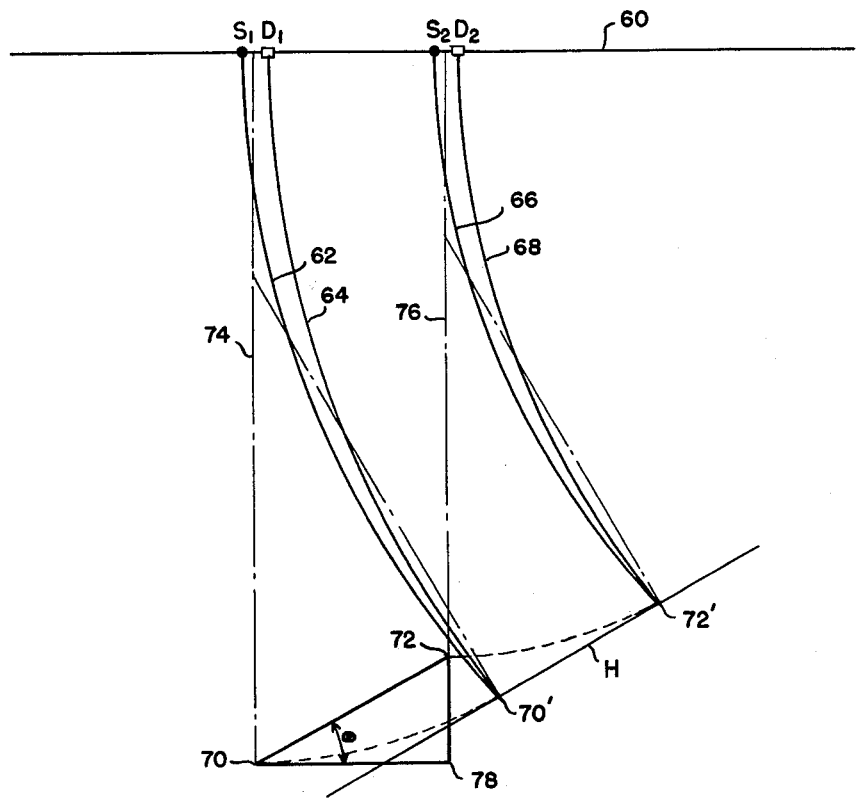

Figure 6 is a plan view of the apparatus showing parts thereof displaced from their positions as shown in Figures 3 and 5 representing a third step in the manipulation of the apparatus; and Figure 7 is a conventional diagram showing the paths of seismic waves emanating from shot points and being reflected from subsurface locations to seismic detectors and also embodying a time diagram of the reflection conditions shown.

Figure 1:
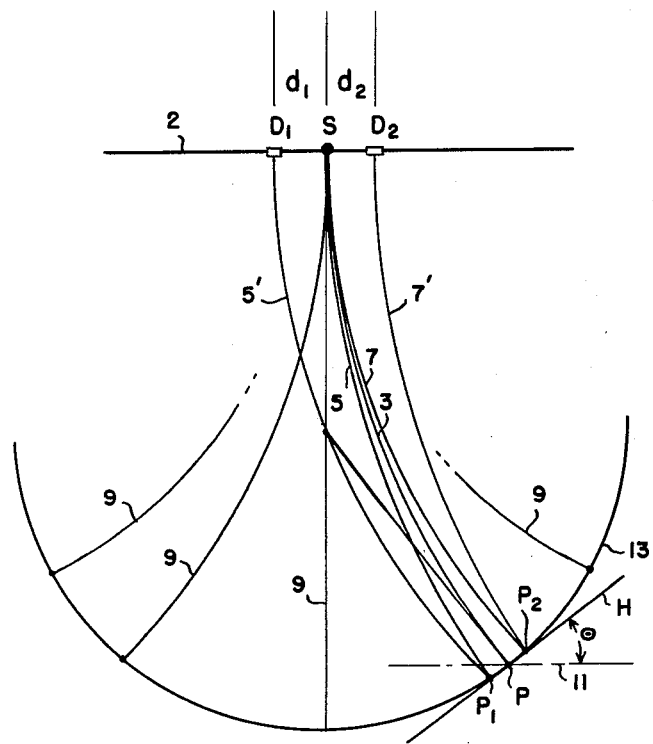
Figure 1 is a conventionalized diagram showing the paths of seismic waves emanating from a shot point and being reflected from subsurface locations to seismic detectors.

Referring to Figure 1 there is shown at 2 a line representative of the surface of the earth on, or adjacent to, which there is positioned a source of seismic disturbance S and a pair of detectors $D_1$ and $D_2$ spaced equal distances from the shot point S as indicated by the dimension lines $d_1$ and $d_2$. When a shot is fired at the shot point S, seismic waves will pass downwardly into the earth along ray paths such as those indicated at 3, 5, 7 and 9 and reflections thereof from subsurface horizons will be received at the detectors $D_1$ and $D_2$.

If the elapsed time between the firing of the shot and the reception of the reflected waves at detector $D_1$ is $t_1$ and the elapsed time between the firing of the shot and the reception of the reflected waves at the detector $D_2$ is $t_2$ and these times are alike, the reflection will have been from a horizontal reflecting horizon and, if the elapsed times are not alike, it will be evident that the reflecting horizon is not horizontal. In either event, the reflections received at detectors $D_1$ and $D_2$ will be from points which may be represented as $P_1$ and $P_2$, respectively, on a reflecting horizon spaced apart by a distance $$\frac{d_1 + d_2}{2}$$

and spaced half this distance from a midpoint P at which a tangent to a ray path passing through point P is perpendicular to the reflecting horizon H. A wave passing along the ray path 5 from the shot point S will be reflected from a point $P_1$ on the reflecting horizon and pass along a return path 5′ to the detector $D_1$. A wave passing along the ray path 7 from the shot point S will be reflected from a point $P_2$ on the reflecting horizon and pass along a return path 7' to the detector $D_2$. The angle $\theta$ shown in Figure 1 is the angle between the horizontal 11 and reflecting horizon H tangent to the wave front circle 13 at point P.

From the foregoing, it will be evident that the difference in elapsed time between the firing of the shot and the reception of reflected waves at the detectors $D_1$ and $D_2$ will result because of the unequal length of the ray paths 7—7' and 5—5', and only one location on the wave front circle 13 will satisfy the time requirement conditions for any pair of elapsed time intervals.

Figure 2:
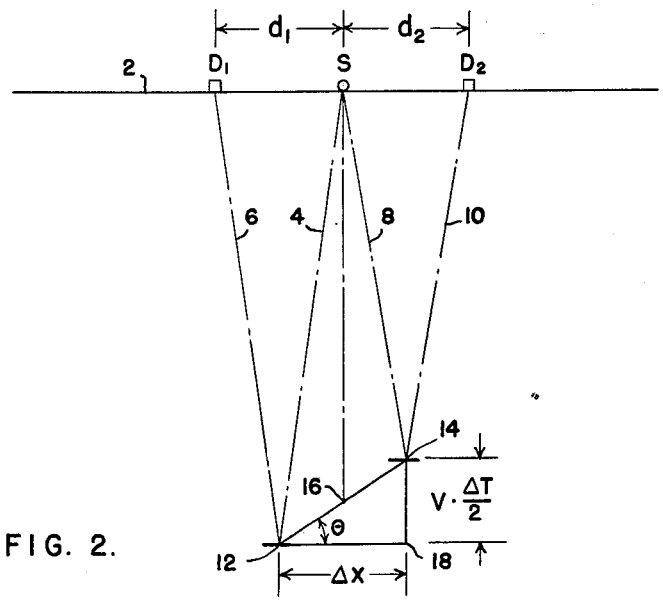
Figure 2 is a time diagram of the reflection conditions shown in Figure 1.

In the diagram of Figure 2 there is positioned at the surface of the earth 2 a source of seismic disturbance S and a pair of detectors $D_1$ and $D_2$ spaced equal distances from the shot point S as indicated by the dimension lines $D_1$ and $D_2$. This portion of the diagram is the same as what is shown in Fig. 1.

If it is assumed that the reflecting points are on horizontal planes as indicated at 12 and 14, the wave path from the shot point to detector $D_1$ may be indicated in a conventionalized fashion by the lines 4 and 6 and the wave path from the shot point to detector $D_2$ may be indicated in a conventionalized fashion by the lines 8 and 10.

The midpoint 16 of an inclined line drawn between the reflecting points 12 and 14 will be directly below the shot point S and the horizontal base line 12—18 of the triangle 12—14—18 will represent the distance between reflecting points assuming a horizontal strata. The length of the base of the triangle 12—18 may be expressed as $\Delta X$ and the length of the side of the triangle 14—18 may be expressed as $$V \cdot \frac{\Delta T}{2}$$

where $V$=the velocity in the region of planes 12 and 14, and
$\Delta T = t_1 - t_2$ then:

$$\tan \theta = \frac{V \cdot \Delta T}{2 \Delta X}$$

The diagram of Figure 2 is a time diagram representing a graphical solution of this equation under the assumed artificial conditions of horizontal horizons 12 and 14. Under actual conditions, when the reflecting horizons 12 and 14 lie on the same horizontal line, the angle $\theta$ will be 0 and the ray path will be a straight downwardly extending line. For an angle $\theta$ as shown in Figure 2, the ray path will be curved in the manner of the ray path 3 as shown in Figure 1 and a point P of distance S–16 along the curved ray path 3 will be a point on the reflecting horizon at an angle to a horizontal. It will be evident that if a plurality of these points can be determined along the surface of the reflecting boundary, the configuration of the boundary surface can be determined. The apparatus for determining these ray paths and for locating these points may now be described.

In Figure 3 there is shown at 20 a block which is adapted to be placed on a scaled drawing with a location on the drawing representative of a shot point at the point of intersection of the projections of the two lines 22 and 24 which is in alignment with the lower edge 26 of the block 20 and with the lower edge 26 of the block extending horizontally. The block is provided with a groove through which there is extended a rod or bar 28. The rod 28 is shown as being tapered, reducing in thickness toward its lower end in what is preferably a parabolic taper. The longitudinal axis of the bar extends perpendicular to the lower edge 26 of the block 20 when the bar is in a relaxed state.

Superimposed discs 30 and 32 are rotatably mounted on a pin 34. The discs are rotatable with respect to each other as well as with respect to the pin 34. The pin 34 is mounted in a fitting 40 which is affixed to the rod 28 by means of a screw 42 and a deformable friction washer 36 is positioned between the disc 30 and the fitting 40. The uppermost disc 30 is preferably transparent. The lower disc 32 is provided with an indicating line 44 extending diametrically of the disc and the disc is provided with notches 46 on its peripheral face adjacent to the ends of the line 44. The upper disc 30 is provided with an indicating line 48 extending diametrically of the disc and terminating at notches 50 in the periphery of the disc.

From the foregoing it will be evident that the rod 28 may be moved through the fitting 40 in order to raise and lower the pair of discs 30 and 32. It will be evident that the same result can be obtained if the rod 28 has parallel sides and is fixed in the fitting 40 and slidable in the block 20. The rod 28 is preferably parabolically tapered in order that when the rod is deflected it will assume circular form. If a non-tapered rod is employed, the rod when deflected will assume a parabolic form and, while for many applications the error introduced by a parabolically curved rod would be relatively small, more accurate results can be obtained by the use of a parabolically tapered rod which will upon deflection assume a circular form.

The manipulation of the device involves three successive steps the first of which can be understood by viewing Figure 2. The block 20 is positioned with the point of intersection of the projections of the lines 22 and 24 lying over the shot point S as previously described. The fitting 40 is moved along the rod until the center of the pin 34 lies over the midpoint 16 of the side 12—14 of the triangle described in connection with Figure 2. The disc 32 is rotated until the line 44 thereof lies coincident with the side 12—14 of the triangle. The disc 3 is then rotated until the line 48 extends horizontally.

The second step is to rotate the two discs in unison until the line 44 of the disc 32 extends horizontally as shown in Figure 5. The line 48 will then be at an angle of 180° minus $\theta$ to the horizontal.

The third step is to deflect the rod 28 by applying a force perpendicular to a tangent to the longitudinal axis of the rod 28 at the screw 42 while holding the block 20 in a stationary position with respect to the shot point S as previously described until the line 48 on the disc 30 assumes a horizontal position. With the rod 28 in this position of deflection, the rod 28 will lie coincident with the desired curved ray path and the center of rotation of the discs will represent a point on the boundary of the subsurface strata from which the reflections indicated in Figure 1 were obtained.

It will be evident that by making a sequence of determinations of time in accordance with the arrangement described in connection with Figure 1 by the use of a succession of spaced shot points and detector locations, and that by the employment of the data thus obtained in connection with successive manipulation of the apparatus as described a succession of points may be determined on the boundary of the strata involved and the boundary location may thus be determined. It will further be evident that the apparatus described provides a relatively simple means by which a rapid determination may be made of subsurface boundaries from seismic data.

It will now be apparent upon viewing Figure 7 that the use of the apparatus is not confined to the specific arrangement of the shot point and detectors as shown in Figures 1 and 2. As shown in Figure 7, any arrangement may be employed where a pair of shot points $S_1$ and $S_2$ positioned in the vicinity of the surface of the earth 60 may be employed with a pair of detectors $D_1$ and $D_2$. A ray path from shot $S_1$ is indicated at 62 as passing downwardly into the earth to a point 70' on a reflecting horizon H and the ray path of the wave reflected from point 70' to the detector $D_1$ is indicated at 64. Similar ray paths 66 and 68 are shown extending between the shot point $S_2$ and a point 72', and the detector $D_2$ and the point 72', respectively. The elapsed time between the firing of the shot at $S_1$ and the arrival at detector $D_1$ of the reflected wave may be expressed as $t_1$ and the elapsed time between the firing of the shot at shot point $S_2$ and the arrival of reflected waves at detector $D_2$ may be expressed as $t_2$.

If in connection with this diagram the two reflections are assumed to be from horizontal strata, a vertically extending time line 74 may be drawn from the midpoint between the shot point $S_1$ and detector $D_1$ to a point 70 on a horizontal plane at a depth of $$\frac{t_1}{2}$$

The point of intersection of the ray path and the point 70 will be on the wave front circle passing through the point 70'. If a similar point 72 is drawn on a horizontal strata intersecting a vertical time line 76 extending downwardly from the midpoint between the shot point $S_2$ and the detector $D_2$ at a distance of $$\frac{t_2}{2}$$

the point 72 will lie on the wave front circle passing through point 72'. A right triangle may now be drawn using as the apexes thereof the points 70 and 72 and the point of intersection of the time line 76 with the horizontal plane drawn through the point 70, i.e., point 78. This right triangle 70—72—78 is similar to the triangle 12—14—18 shown in Figure 2 and the angle 72—70—78 is similar to angle $\theta$ shown in Figure 2.

It will be evident that in this diagram any point on the line 70—72 will have an equivalent point on the line extending between points 70' and 72' at the point of intersection therein of its wave front circle. Thus, in a diagram such as shown in Figure 7, the apparatus described in connection with Figures 3-6 may be positioned with the lower edge of the block 26 lying anywhere on the line extending between the shot points and by positioning the center of the rotatable members on the line 70—72 and manipulating the device as hereinabove described, a point on the reflecting horizon H will be determined and the angle of the horizon will be determined.

What is claimed is:

1. A method of seismic prospecting comprising creating a seismic disturbance in the earth, measuring the elapsed time between the creation of the seismic disturbance and receipt of reflections of the seismic disturbance from two reflection points on subsurface strata at two detectors spaced on opposite sides of the source of the seismic disturbance, positioning a flexible elongated member on a scaled drawing with a portion of the member held in position over a location on the drawing representing the location of the source of the seismic disturbance, positioning a member rotatable on the flexible member at an angle to the horizontal equal to 180° minus the angle formed between the horizontal and a line on the drawing connecting points representing the two reflection points on the subsurface strata, assuming the reflection points to be on horizontal planes, and positioning the rotatable member with its center of rotation over the line, and then deflecting the elongated member until the rotatable member lies on a horizontal plane on the drawing and marking the drawing to indicate the location thereon of the axis of rotation of the rotatable member.

2. A method of seismic prospecting comprising creating a seismic disturbance in the earth, measuring the elapsed time between the creation of the seismic disturbance and receipt of reflections of the seismic disturbance from two reflected points on subsurface strata at two detectors equidistantly spaced on opposite sides of the source of the seismic disturbance, positioning a flexible elongated member on a scaled drawing with a portion of the member held in position over a location on the drawing representing the location of the source of the seismic disturbance, positioning a member rotatable on the flexible member at an angle to the horizontal equal to 180° minus the angle formed between the horizontal and a line on the drawing connecting points representing the two reflection points on the subsurface strata, assuming the reflection points to be on horizontal planes, and positioning the rotatable member with its center of rotation crossing the midpoint of the line, and then deflecting the elongated member until the rotatable member lies on a horizontal plane on the drawing and marking the drawing to indicate the location thereon of the axis of rotation of the rotatable member.

3. A method of seismic prospecting comprising creating a seismic disturbance in the earth, measuring the elapsed time between the creation of the seismic disturbance and receipt of reflections of the seismic disturbance from two reflection points on subsurface strata at two detectors equidistantly spaced on opposite sides of the source of the seismic disturbance, positioning a flexible elongated member on a scaled drawing with a portion of the member held in fixed position over a location on the drawing representing the location of the source of the seismic disturbance, positioning a member rotatable on the flexible member at an angle to the horizontal equal to 180° minus the angle formed between the horizontal and a line on the drawing connecting points representing the two reflection points on the subsurface strata, assuming the reflection points to be on horizontal planes, and positioning the rotatable member with its center of rotation crossing the midpoint of the line, and then deflecting the elongated member by applying force at the axis of rotation of the rotatable member until the rotatable member lies on a horizontal plane on the drawing and marking the drawing to indicate the location thereon of the axis of rotation of the rotatable member.

4. A method of seismic prospecting for determining the location of a subsurface boundary on the scaled drawing comprising creating a seismic disturbance in the earth, measuring the elapsed time between the creation of the seismic disturbance and receipt of reflections of the seismic disturbance from two reflection points on subsurface strata at two detectors spaced on opposite sides of the source of the seismic disturbance, positioning a flexible elongated member on a scaled drawing with a portion of the member held in position over a location on the drawing representing the location of the source of the seismic disturbance, positioning a member rotatable on the flexible member at an angle to the horizontal equal to 180° minus the angle formed between the horizontal and a line on the drawing connecting points representing the two reflection points on the subsurface strata, assuming the reflection points to be on horizontal planes, and positioning the rotatable member with its center of rotation crossing the line, and then deflecting the elongated member until the rotatable member lies on a horizontal plane on the drawing and marking the drawing to indicate the location thereon of the axis of rotation of the rotatable member, repeating the foregoing procedure with the source of disturbance and the two detectors moved to successive locations to provide an array of marked locations on the drawing, and connecting the array of locations thus determined to display on the drawing the position of the subsurface strata.

5. A method of seismic surveying comprising creating a first seismic disturbance in the earth, measuring the elapsed time between the creation of the seismic disturbance and the receipt at a first detector of reflections of the seismic disturbance from a reflection point on a subsurface strata, creating a second seismic disturbance in the earth, measuring the elapsed time between the creation of the second seismic disturbance and the receipt at a second detector of reflections of the second seismic disturbance from a second reflection point on the subsurface strata, positioning a flexible elongated member on a scaled drawing with a portion of the member held in position over a location on a line on the drawing extending through locations on the drawing representing the locations of the sources of the seismic disturbances, positioning a member rotatable on the flexible member at an angle to the horizontal equal to 180° minus the angle formed between the horizontal and a line on the drawing connecting points representing the two reflection points on subsurface strata, assuming the reflection points to be on horizontal planes, and positioning the rotatable member with its center of rotation over the line, and then deflecting the elongated member until the rotatable member lies on a horizontal plane on the drawing and marking the drawing to indicate the location thereon of the axis of rotation of the rotatable member.

6. A method of seismic surveying comprising creating a first seismic disturbance in the earth, measuring the elapsed time between the creation of the seismic disturbance and the receipt at a first detector of reflections of the seismic disturbance from a reflection point on a subsurface strata, creating a second seismic disturbance in the earth, measuring the elapsed time between the creation of the second seismic disturbance and the receipt at a second detector of reflections of the second seismic disturbance from a second reflection point on the subsurface strata, positioning a flexible elongated member on a scaled drawing with a portion of the member held in position over a location on a line on the drawing extending through locations on the drawing representing the locations of the sources of the seismic disturbances, positioning a member rotatable on the flexible member at an angle to the horizontal equal to 180° minus the angle formed between the horizontal and a line on the drawing connecting points representing the two reflection points on subsurface strata, assuming the reflection points to be on horizontal planes, and positioning the rotatable member with its center of rotation crossing the midpoint of the line, and then deflecting the elongated member by applying force at the axis of rotation of the rotatable member until the rotatable member lies on a horizontal plane on the drawing and marking the drawing to indicate the location thereon of the axis of rotation of the rotatable member.

7. A method of seismic prospecting for determining the location of a subsurface boundary on a scaled drawing comprising creating a first seismic disturbance in the earth, measuring the elapsed time between the creation of the seismic disturbance and the receipt at a first detector of reflections of the seismic disturbance from a reflection point on a subsurface strata, creating a second seismic disturbance in the earth, measuring the elapsed time between the creation of the second seismic disturbance and the receipt at a second detector of reflections of the second seismic disturbance from a second reflection point on the subsurface strata, positioning a flexible elongated member on a scaled drawing with a portion of the member held in position over a location on a line on the drawing extending through locations on the drawing representing the locations of the sources of the seismic disturbances, positioning a member rotatable on the flexible member at an angle to the horizontal equal to 180° minus the angle formed between the horizontal and a line on the drawing connecting points representing the two reflection points on subsurface strata, assuming the reflection points to be on horizontal planes, and positioning the rotatable member with its center of rotation crossing the line, and then deflecting the elongated member until the rotatable member lies on a horizontal plane on the drawing and marking the drawing to indicate the location thereon of the axis of rotation of the rotatable member, repeating the foregoing procedure with the sources of disturbance and the two detectors moved to successive locations to provide an array of marked locations on the drawing, and connecting the array of locations thus determined to display on the drawing the position of the subsurface strata.

8. In apparatus for use in seismic prospecting for determining the location of a subsurface boundary on a scaled drawing having thereon a horizontal ground line, a point on said ground line representing a source of seismic disturbance, points on said ground line representing a pair of detectors equally spaced from said source of seismic disturbance, and a pair of working points representing points from whence straight line rays from said source of seismic disturbance are reflected respectively to said detectors from different assumed horizontal horizons, the combination comprising a member provided with reference means adapted for use in locating said member with respect to said point of seismic disturbance and orienting the same with respect to said ground line, an elongated member having one end portion fixed in said reference member and in use normally extending therefrom perpendicular to said ground line and over said point of seismic disturbance, an assembly mounted upon the opposite end of said elongated member including a pair of elements each bearing indicating means, said elements being turnable relative to one another and each of said elements being turnable relative to said elongated member about a common axis for being initially positioned with said indicating means respectively parallel to said horizontal horizons and a line extending through said assumed working points of reflection, and means for varying the effective distance between said reference member and assembly whereby said common axis may be brought into coincidence with a point midway between said assumed working points of reflection, said pair of elements being turnable together through the angle included between said indicating means, and said elongated member being flexible for being turned to one side in substantially a circular arc thereby to return said indicating means each to a position parallel to that initially occupied thereby.

9. Apparatus as defined in claim 8 wherein the indicating elements are mutually overlying concentric discs.

10. In apparatus for use in seismic prospecting for determining the location of a subsurface boundary on a scaled drawing having thereon a horizontal ground line, a point on said ground line representing a source of seismic disturbance, points on said ground line representing a pair of detectors equally spaced from said source of seismic disturbance, and a pair of working points representing points from whence straight line rays from said source of seismic disturbance are reflected respectively to said detectors from different assumed horizontal horizons, the combination comprising a member provided with reference means adapted for use in locating said member with respect to said point of seismic disturbance and orienting the same with respect to said ground line, an elongated member having one end portion fixed in said reference member and in use normally extending therefrom perpendicular to said ground line and over said point of seismic disturbance, and assembly mounted upon the opposite end of said elongated member including a pair of mutually overlying flat concentric discs each bearing indicating means disposed on a diameter thereof, said discs being turnable relative to one another about a common axis for being initially positioned with said indicating means respectively parallel to said horizontal horizons and a line extending through said assumed working points of reflection, and means for varying the effective distance between said reference member and assembly whereby said common axis may be brought into coincidence with a point midway between said assumed working points of reflection, said pair of discs being turnable together through the angle included between said indicating means, and said elongated member being flexible for being turned to one side in substantially a circular arc thereby to return said indicating means each to a position parallel to that initially occupied thereby.

11. Apparatus as defined in claim 10 wherein the elongated member is tapered.

12. Apparatus as defined in claim 10 wherein the elongated member is tapered with a substantially parabolic taper."

References Cited in the file of this patent

UNITED STATES PATENTS

| | | |
|---|---|---|
| 695,747 | Lydick | Mar. 18, 1902 |
| 2,034,350 | Mario | Mar. 17, 1936 |
| 2,323,528 | Faulhaber | July 6, 1943 |
| 2,337,144 | Young | Dec. 21, 1943 |
| 2,582,488 | Kroenlein | Jan. 15, 1952 |

FOREIGN PATENTS

| | | |
|---|---|---|
| 97,668 | Germany | June 14, 1898 |

OTHER REFERENCES

Publication, "Flexible Beam Compass Coils into Pocket Container," Popular Mechanics Magazine, July 1945, page 139. (Copy in 33–27C.)